(12) United States Patent
Qiao et al.

(10) Patent No.: US 9,042,007 B1
(45) Date of Patent: May 26, 2015

(54) OPTICAL AMPLIFIER

(71) Applicant: Oplink Communications, Inc., Fremont, CA (US)

(72) Inventors: Lijie Qiao, Ottawa (CA); Ting Yang, Wuhan (CN)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 14/338,226

(22) Filed: Jul. 22, 2014

(51) Int. Cl.
*H01S 3/00* (2006.01)
*H01S 3/10* (2006.01)
*H01S 3/094* (2006.01)
*H01S 3/16* (2006.01)

(52) U.S. Cl.
CPC ....... *H01S 3/10023* (2013.01); *H01S 3/094042* (2013.01); *H01S 3/1698* (2013.01); *H01S 3/1608* (2013.01); *H01S 3/094003* (2013.01); *H01S 3/094061* (2013.01)

(58) Field of Classification Search
CPC ..................... H01S 3/094003; H01S 3/094061

USPC ..................................................... 359/341.32
See application file for complete search history.

(56) References Cited

U.S. PATENT DOCUMENTS

| | | | |
|---|---|---|---|
| 5,506,723 A * | 4/1996 | Junginger | 359/341.3 |
| 6,580,556 B2 * | 6/2003 | Kakizawa | 359/462 |
| 6,583,925 B1 * | 6/2003 | Delavaux et al. | 359/341.32 |
| 6,934,078 B2 * | 8/2005 | Hwang et al. | 359/341.32 |
| 8,351,112 B2 * | 1/2013 | Takeyama | 359/337.4 |
| 2004/0196539 A1 * | 10/2004 | Chang et al. | 359/341.41 |
| 2010/0091357 A1 * | 4/2010 | Ueki et al. | 359/337.13 |

* cited by examiner

*Primary Examiner* — Mark Hellner
(74) *Attorney, Agent, or Firm* — Fish & Richardson P.C.

(57) ABSTRACT

Methods, systems, and apparatus for optical communications. In one aspect, an optical amplifier includes a feed-forward first amplification stage including a rare-earth doped fiber receiving an optical signal and an injected pump light; and a plurality of subsequent amplification stages each including a corresponding rare-earth doped fiber, wherein each of the subsequent amplification stages receives a separately injected portion of the remnant pump light from the first amplification stage, the remnant pump light being split into portions directed to each respective subsequent amplification stage.

20 Claims, 2 Drawing Sheets

OPTICAL AMPLIFIER

BACKGROUND

This specification relates to optical communications.

Optical fiber amplifiers are commonly used in communication systems. Types of optical fiber amplifiers include Rare Earth Doped Fiber Amplifiers, for example, Erbium Doped Fiber Amplifiers ("EDFAs"). The optical fiber amplifiers are usually pumped by one or more light emitter diode (LEDs) or laser pump sources.

An erbium doped fiber (EDF) is a form of a single-mode fiber, having a core that is heavily doped with erbium. Conventional EDFA's include a pump laser that provides a pump light to the erbium doped fiber to provide amplification. For example, when pump light at 980 nm or 1480 nm is injected into an EDF, the erbium atoms absorb the pump light, which pushes the erbium atoms into excited states. When stimulated by light streams, for example an input optical signal having one or more wavelengths in a C-band (1528-1570 nm) or an L band (1570-1620 nm), the excited atoms return to a ground or lower state by stimulated emission. The stimulated emission has the same wavelength as that of the stimulating light. Therefore, the optical signal is amplified as it is propagating through the EDF. Furthermore, the EDF typically amplifies the entire optical signal regardless of wavelength.

SUMMARY

In general, one innovative aspect of the subject matter described in this specification can be embodied in optical amplifiers that include: a feed-forward first amplification stage including a rare-earth doped fiber receiving an optical signal and an injected pump light; and multiple subsequent amplification stages each including a corresponding rare-earth doped fiber, wherein each of the subsequent amplification stages receives a separately injected portion of the remnant pump light from the first amplification stage, the remnant pump light being split into portions directed to each respective subsequent amplification stage.

The foregoing and other embodiments can each optionally include one or more of the following features, alone or in combination. In particular, one embodiment includes all the following features in combination. The optical amplifier includes a pump source coupled to a first pump wavelength division multiplexer (WDM) for injecting the pump light to the first amplification stage. The optical amplifier includes a second pump WDM coupled to an output of the first amplification stage configured to separate the remnant pump light from the optical signal. The optical amplifier includes a tap coupled to the second pump WDM and configured to receive the remnant pump light and to separate the remnant pump light into multiple ports corresponding to respective paths. The optical amplifier includes a third pump WDM configured to combine a split portion of the remnant pump light with the optical signal from the first amplification stage prior to entering a first subsequent amplification stage. The optical amplifier includes a fourth pump WDM configured to combine a split portion of the remnant pump light with the optical signal from the first subsequent amplification stage prior to entering a second subsequent amplification stage. The optical amplifier further includes an input tap coupled to the first amplification stage configured to tap a portion of the optical signal input and to route the tapped portion to an input photo detector; and an output tap coupled to the one or more second amplification stages configured to tap a portion of an amplified optical signal output and to route the tapped portion to an output photo detector. The optical amplifier further includes a controller configured to measure the power of the input optical signal and the amplified optical signal and to control the pump source. The output tap is also coupled to an output port of the optical amplifier. The rare-earth doped fiber is an erbium doped fiber. The optical amplifier includes a gain flattening filter (GFF) positioned between a pair of the multiple second amplification stages. The GFF is positioned between a first subsequent amplification stage and a second subsequent amplification stage.

In general, one innovative aspect of the subject matter described in this specification can be embodied in optical amplifiers that include: a pump light source; an input coupled to a first amplification stage, the first amplification stage including a first rare-earth doped fiber and configured to receive an optical signal combined with pump light from the pump light source; a first pump wavelength division multiplexer (WDM) for separating remnant pump light from the light exiting the first amplification stage; an optical component that splits the separated remnant pump light into two or more ports; a second pump WDM for combining a first split portion of the remnant pump light with an optical signal from the first amplification stage; a second amplification stage including a second rare-earth doped fiber and configured to receive the combined first split portion of the remnant pump light combined with the optical signal from the first amplification stage; a third pump WDM for combining a second split portion of the remnant pump light with an optical signal from the second amplification stage; and a third amplification stage including a third rare-earth doped fiber and configured to receive the combined second split portion of the remnant pump light combined with the optical signal from the second amplification stage.

The foregoing and other embodiments can each optionally include one or more of the following features, alone or in combination. In particular, one embodiment includes all the following features in combination. The optical amplifier further includes a controller coupled to the pump light source and configured to control the power of the pump light emitted from the pump light source. The optical amplifier further includes a first photo detector coupled to an input of the optical amplifier and configured to measure an input power of the optical signal; and a second photo detector coupled to an output of the optical amplifier and configured to measure an output power of the amplified optical signal. The pump light power is modified by the controller based on the measured input power and the measured output power. The optical amplifier further includes a gain flattening filter coupled between the second amplification stage and the third amplification stage. Each rare-earth doped fiber is an erbium doped fiber.

Particular embodiments of the subject matter described in this specification can be implemented so as to realize one or more of the following advantages. An optical amplifier configuration is described that provides high inversion and noise response using a feed-forward first amplification stage and provides flexibility of using multiple subsequent amplifier stages to provide further amplification using separately injected remnant pump light from the first amplification stage.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
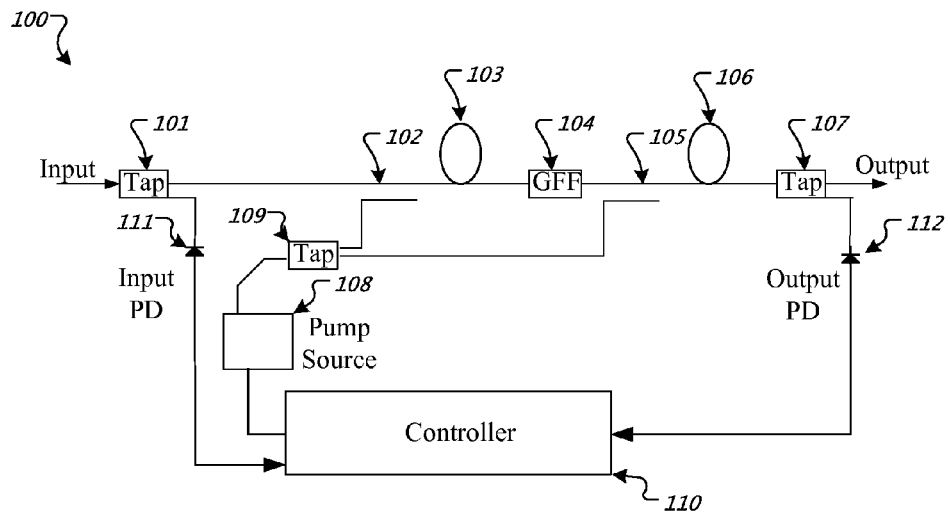
FIG. 1 is a diagram of an example conventional optical amplifier with a pump splitting configuration.

FIG. 1 is a diagram of an example optical amplifier 100 with a pump splitting configuration. In particular, the optical amplifier 100 includes an input tap 101 at an input port that receives an optical signal, e.g., from an optical fiber. The input signal can include multiple wavelength channels. The input tap 101 directs a portion of the input light signal to an input photo detector 111. The input photo detector 111 uses the tapped optical signal to determine a measure of the total input power. The input photo detector 111 can be, for example, a photo diode. The input tap 101 can be, for example, a fused fiber coupler. In some implementations, the input tap 101 directs substantially 1% to 5% of the input optical signal to the input photo detector 111.

The majority of the optical signal passes through the input tap 101 and is joined with a first pump wavelength division multiplexer (WDM) 102 before being input to a first rare-earth doped fiber 103 providing a first amplification stage.

The first pump WDM 102 multiplexes the input light signal with at least a portion of laser light emitted by a pump source 108. Light from the pump source 108 is split by a tap 109 and a portion of the pump light is directed to the first pump WDM 102 and a portion of the pump light is directed to a second pump WDM 105. This allows for a single pump source 108 to transmit pump light to multiple amplification stages having rare-earth doped fibers, which provide for a multi-stage optical amplifier design.

In some implementation, the tap 109 evenly splits the pump light. In some other implementations, a specified proportion of the pump light is routed to each respective pump WDM.

The combined light signal and pump light from the first pump WDM 102 is input to the first rare-earth doped fiber 103. The first rare-earth doped fiber 103 can be an erbium doped fiber. The first rare-earth doped fiber 103 absorbs the received energy of the pump light. The absorbed pump energy is used to amplify the light of the optical signal to provide an amplified optical signal. However, because the pump light has been split, the first rare-earth fiber 103 may only receive a portion of the maximum pump light it can absorb. This may result is a noise figure of the optical amplifier 100 that is worse than when a maximum pump light is received. The noise figure refers to a measure of degradation of signal-to-noise ratio, which can be used to measure performance of an optical amplifier.

Thus, the input signal is amplified by the first rare-earth doped fiber 103. However, the gain provided by the first rare-earth doped fiber 103 is not uniform over the signal spectrum (i.e., across all wavelengths of the optical signal). To provide a flat spectral gain across all wavelengths, the amplified signal from the first rare-earth doped fiber 103 is subsequently filtered by a gain flattening filter (GFF) 104. The GFF 104 attenuates one or more wavelengths by a particular amount.

After passing through the GFF 104, a resulting filtered optical signal intersects with the second pump WDM 105, which combines the optical signal output from the GFF 104 with the split portion of the pump light from the tap 109. The combined light signal and pump light from the second pump WDM 105 is input to a second amplification stage including a second rare-earth doped fiber 106. The second rare-earth doped fiber 106 absorbs the energy of the split pump light, as well as any residual pump light from the first rare-earth doped fiber 103, and further amplifies the optical signal.

The amplified optical signal is tapped by output tap 107, which samples a portion of the amplified optical signal while allowing most of the amplified optical signal to exit the optical amplifier 100, e.g., though an optical fiber at an output port coupled to the output tap 107. The output tap 107 directs the tapped portion of the amplified light signal to an output photo detector 112. The output photo detector 112 uses the tapped optical signal to determine a measure of the total output power. The output photo detector 112 can be, for example, a photo diode. The output tap 107 can be, for example, a fused fiber coupler. In some implementations, the output tap 107 directs substantially 1% to 5% of the input optical signal to the output photo detector 112.

The measured input power and output power from the input photo detector 111 and the output photo detector 112, respectively, are used by a controller 110 to control the power of the pump light generated by the pump source 108. For example, the controller 110 can be used to determine whether the optical amplifier 100 is providing a specified amount of gain to the optical signal. The average gain of the optical amplifier 100 can be calculated as a ratio between the total output power measured by the output photo detector 112 and the total input power measured by the input photo detector 111. The controller can signal the pump source 108 to increase or decrease pump light power based on the measurements and one or more specified amplification parameters, e.g., a specified output gain range.

Figure 2:
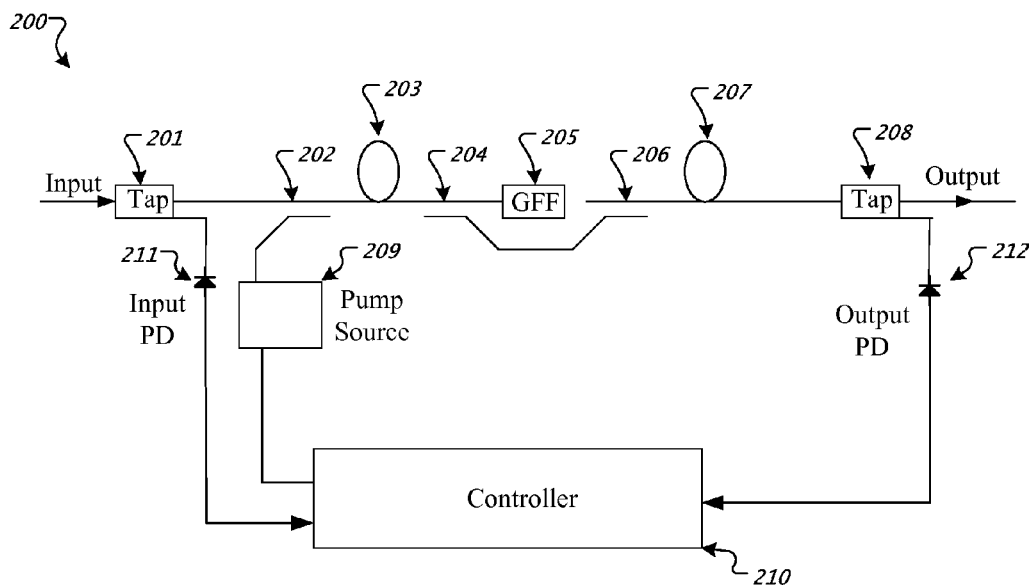
FIG. 2 is a diagram of an example conventional optical amplifier with a pump feed-forward configuration.

FIG. 2 is a diagram of an example optical amplifier 200 with a pump feed-forward configuration. In the pump feed forward configuration, all of the available pump power is provided to a first stage of the optical amplifier 200 for higher inversion and better noise figure. The remnant pump light after a first amplification stage, e.g., a first rare-earth fiber, is input to a second amplification stage and so on. However, the remnant light may not be sufficient to provide a desired amount of amplification to a light signal through multiple stages of the optical amplifier.

The optical amplifier 200 includes an input tap 201 that receives an optical signal at an input port, e.g., from an optical fiber. The input signal can include multiple wavelength channels. The input tap 201 directs a portion of the input light signal to an input photo detector 211. The input photo detector 211 uses the tapped optical signal to determine a measure of the total input power. The input tap 201 can be, for example, a fused fiber coupler. In some implementations, the input tap 101 directs substantially 1% to 5% of the input optical signal to the input photo detector 211.

The majority of the optical signal passes through the input tap 201 and is joined with a first pump wavelength division multiplexer (WDM) 202 before being input to a first rare earth doped fiber 203, providing a first amplification stage. The first pump WDM 202 multiplexes the input light signal with at least a portion of laser light emitted by a pump source 209.

The combined light signal and pump light from the first pump WDM 202 is input to the first rare-earth doped fiber 203 of a first amplification stage. The first rare-earth doped fiber 203 can be an erbium doped fiber. The first rare-earth doped fiber 203 absorbs the received energy of the pump light. The absorbed pump energy is used to amplify the light of the optical signal to provide an amplified optical signal.

A second pump WDM 204 separates the initially amplified optical signal from the remnant pump light of the first rear-earth doped fiber 203. The initially amplified optical signal passes through a GFF 205, similar to the GFF 104 of FIG. 1. The remnant pump light is routed around the GFF 205 to combine with the initially amplified optical signal at a third pump WDM 206. This combination of the remnant pump light and initially amplified optical signal is input to a second rare-earth doped fiber 207. The second rare-earth doped fiber 207 absorbs the energy of the remnant pump light and further amplifies the optical signal.

The amplified optical signal exiting the second rare-earth doped fiber 207 is tapped by output tap 208, which samples a portion of the amplified optical signal while allowing most of the amplified optical signal to exit the optical amplifier 200, e.g., through an optical fiber at an output port coupled to the output tap 208. The output tap 208 directs the tapped portion of the amplified light signal to an output photo detector 212. The output photo detector 212 uses the tapped optical signal to determine a measure of the total output power as described above with respect to output photo detector 112.

The measured input power and output power from the input photo detector 211 and the output photo detector 212, respectively, are used by a controller 210 to control the power of the pump light generated by the pump source 209. For example, the controller 210 can be used to determine whether the optical amplifier 200 is providing a specified amount of gain to the optical signal. The average gain of the optical amplifier 200 can be calculated as a ratio between the total output power measured by the output photo detector 212 and the total input power measured by the input photo detector 211. The controller can signal the pump source 209 to increase or decrease pump light power based on the measurements and one or more specified amplification parameters, e.g., a specified output gain range.

Figure 3:
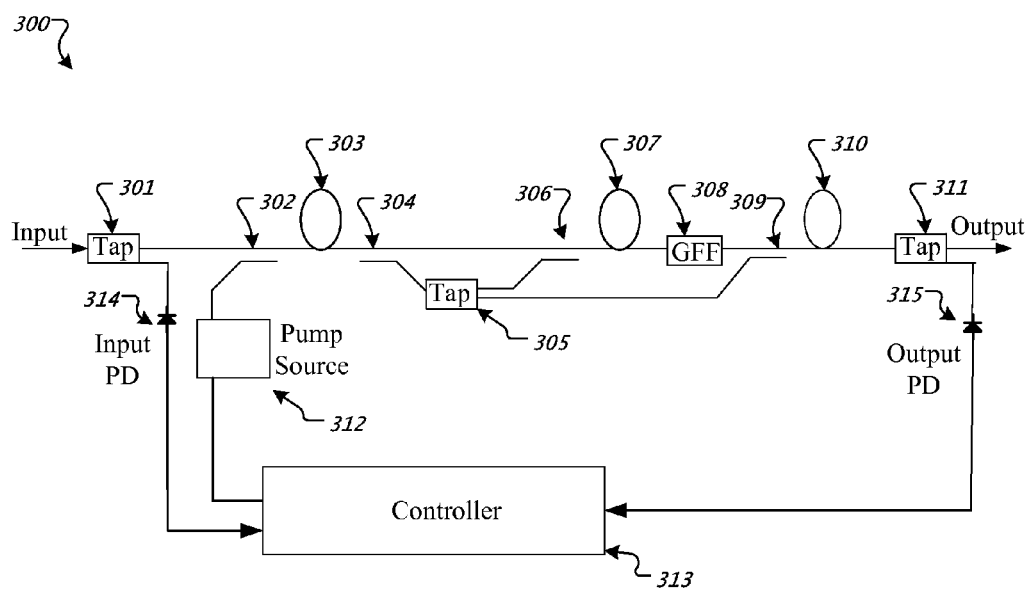
FIG. 3 is a diagram of an example optical amplifier with a combined pump feed-forward and pump splitting configuration.

FIG. 3 is a diagram of an example optical amplifier 300 with a combined pump feed-forward and pump splitting configuration. In particular, the optical amplifier 300 is configured to split remnant pump power after a first feed forward amplification stage to two or more subsequent amplification stages using pump light splitting. Thus, the configuration has an advantage of supplying full pump light power to a first stage resulting in high first stage inversion while allowing pumping to multiple subsequent amplification stages.

The optical amplifier 300 includes an input tap 301 that receives an optical signal at an input port, e.g., from an optical fiber. The input signal can include multiple wavelength channels. The input tap 301 directs a portion of the input light signal to an input photo detector 314. The input photo detector 314 uses the tapped optical signal to determine a measure of the total input power. The input tap 301 and input photo detector 314 can be similar to the input tap 101 and input photo detector 111 described above.

The majority of the optical signal passes through the input tap 301 and is joined with a first pump WDM 302 before being input to a first rare earth doped fiber 303, providing a first amplification stage. The first pump WDM 302 multiplexes the input light signal with pump laser light emitted by a pump source 312.

The combined light signal and pump light from the first pump WDM 302 is input to the first rare-earth doped fiber 303 of the first amplification stage. The first rare-earth doped fiber 303 can be an erbium doped fiber. The first rare-earth doped fiber 303 absorbs the received energy of the pump light. The absorbed pump energy is used to amplify the light of the optical signal to provide an amplified optical signal.

A second pump WDM 304 separates the initially amplified optical signal from the remnant pump light of the first rare-earth doped fiber 303. The remnant pump light is directed to a tap 305 that splits the remnant pump light into two ports corresponding to distinct paths. In some implementation, the tap 305 evenly splits the pump light. In some other implementations, a specified proportion of the pump light is routed to each respective port.

The initially amplified optical signal is routed to a third pump WDM 306, which combines the initially amplified optical signal with remnant pump light from a first path from the tap 305. This combination of remnant pump light and initially amplified optical signal is input to a second rare-earth doped fiber 307 forming a second amplification stage. The second rare-earth doped fiber 307 absorbs the energy of the remnant pump light and further amplifies the optical signal.

The amplified signal from the second rare-earth doped fiber 307 is subsequently filtered by a gain flattening filter (GFF) 308. The GFF 308 attenuates one or more wavelengths by a particular amount. In some other implementations, there can be more than one GFF, the GFF can be positioned between different amplification stages including between the first amplification stage and the second amplification stage.

After passing through the GFF 308, a resulting optical signal intersects with a fourth pump WDM 309, which combines the optical signal with the split portion of the remnant pump light from the tap 305. The combined optical signal is input to a third rare-earth doped fiber 310 forming a third amplification stage. The third rare-earth doped fiber 310 absorbs the energy of the remnant pump light and further amplifies the optical signal.

The amplified optical signal exiting the third rare-earth doped fiber 310 is tapped by output tap 311, which samples a portion of the amplified optical signal while allowing most of the amplified optical signal to exit the optical amplifier 300, e.g., though an optical fiber at an output port coupled to the output tap 311. The output tap 311 directs the tapped portion of the amplified light signal to an output photo detector 315. The output photo detector 315 uses the tapped optical signal to determine a measure of the total output power as described above with respect to output photo detector 315. The output tap 311 and output photo detector 315 can be similar to the output tap 107 and output photo detector 112 described above.

The measured input power and output power from the input photo detector 314 and the output photo detector 315, respectively, are used by a controller 313 to control the power of the pump light generated by the pump source 312. For example, the controller 313 can be used to determine whether the optical amplifier 300 is providing a specified amount of gain to the optical signal. In some implementations, the average gain of the optical amplifier 300 is calculated as a ratio between the total output power measured by the output photo detector 315 and the total input power measured by the input photo detector 314. The controller can signal the pump source 312 to increase or decrease pump light power based on the measurements and one or more specified amplification parameters, e.g., a specified output gain range.

In the optical amplifier 300, as described above, all of the pump light power is applied to the first amplification stage. As a result, the optical signal is amplified with all of the available pump power for a better noise figure. The remnant pump of the first rare-earth doped fiber 303 is extracted by the second pump WDM 304 and split into two ports by tap 305. Each port of pump power is injected back into the following amplification stages.

Although example in FIG. 3 shows three amplification stages, more are possible. For example, the tap 305 can be configured to separate the remnant pump light into additional paths or one or more additional taps can be used to further split the remnant pump light. The resulting paths can be coupled to additional amplification stages of rare earth doped fibers using corresponding pump WDM's.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An optical amplifier, comprising:
a feed-forward first amplification stage including a rare-earth doped fiber receiving an optical signal and an injected pump light; and
a plurality of subsequent amplification stages, each subsequent amplification stage including a corresponding rare-earth doped fiber, wherein each of the subsequent amplification stages receives a separately injected portion of the remnant pump light from the first amplification stage, the remnant pump light being split into portions directed along respective paths to each respective subsequent amplification stage, and wherein each portion of the remnant pump light is combined with a previously amplified optical signal prior to being input to each corresponding subsequent amplification stage of the plurality of subsequent amplification stages.

2. The optical amplifier of claim 1, comprising a pump source coupled to a first pump wavelength division multiplexer (WDM) for injecting the pump light to the first amplification stage.

3. The optical amplifier of claim 1, comprising a second pump WDM coupled to an output of the first amplification stage configured to separate the remnant pump light from the optical signal.

4. The optical amplifier of claim 3, comprising a tap coupled to the second pump WDM and configured to receive the remnant pump light and to separate the remnant pump light into a plurality of ports corresponding to respective paths.

5. The optical amplifier of claim 4, comprising a third pump WDM configured to combine a split portion of the remnant pump light with the optical signal from the first amplification stage prior to entering a first subsequent amplification stage.

6. The optical amplifier of claim 4, comprising a fourth pump WDM configured to combine a split portion of the remnant pump light with the optical signal from the first subsequent amplification stage prior to entering a second subsequent amplification stage.

7. The optical amplifier of claim 1, further comprising:
an input tap coupled to the first amplification stage configured to tap a portion of the optical signal input and to route the tapped portion to an input photo detector; and
an output tap coupled to the one or more second amplification stages configured to tap a portion of an amplified optical signal output and to route the tapped portion to an output photo detector.

8. The optical amplifier of claim 7, further comprising:
a controller configured to measure the power of the input optical signal and the amplified optical signal and to control the pump source.

9. The optical amplifier of claim 7, wherein the output tap is also coupled to an output port of the optical amplifier.

10. The optical amplifier of claim 1, wherein the rare-earth doped fiber is an erbium doped fiber.

11. The optical amplifier of claim 1, comprising a gain flattening filter (GFF) positioned between a pair of the plurality of second amplification stages.

12. The optical amplifier of claim 11, wherein the GFF is positioned between a first subsequent amplification stage and a second subsequent amplification stage.

13. An optical amplifier, comprising:
a pump light source;
an input coupled to a first amplification stage, the first amplification stage including a first rare-earth doped fiber and configured to receive an optical signal combined with pump light from the pump light source;
a first pump wavelength division multiplexer (WDM) for separating remnant pump light from the light exiting the first amplification stage;
an optical component that splits the separated remnant pump light into two or more ports;
a second pump WDM for combining a first split portion of the remnant pump light with an optical signal from the first amplification stage;
a second amplification stage including a second rare-earth doped fiber and configured to receive the combined first split portion of the remnant pump light combined with the optical signal from the first amplification stage;
a third pump WDM for combining a second split portion of the remnant pump light with an optical signal from the second amplification stage; and a third amplification stage including a third rare-earth doped fiber and configured to receive the combined second split portion of the remnant pump light combined with the optical signal from the second amplification stage.

14. The optical amplifier of claim 13, further comprising a controller coupled to the pump light source and configured to control the power of the pump light emitted from the pump light source.

15. The optical amplifier of claim 14, further comprising:
    a first photo detector coupled to an input of the optical amplifier and configured to measure an input power of the optical signal; and
    a second photo detector coupled to an output of the optical amplifier and configured to measure an output power of the amplified optical signal.

16. The optical amplifier of claim 15, wherein the pump light power is modified by the controller based on the measured input power and the measured output power.

17. The optical amplifier of claim 13, further comprising a gain flattening filter coupled between the second amplification stage and the third amplification stage.

18. The optical amplifier of claim 13, wherein each rare-earth doped fiber is an erbium doped fiber.

19. The optical amplifier of claim 1, wherein the remnant pump light is evenly split into portions.

20. A method comprising:
    receiving an input light signal at an input port;
    combining the input light signal with a pump light signal emitted by a pump source;
    performing a first amplification of the input light signal at a first amplification stage;
    separating the light signal amplified by the first amplification from remnant pump light;
    splitting the remnant pump light into a plurality of paths, each path corresponding to a subsequent amplification stage;
    performing a subsequent amplification of the input light signal at each of the plurality of subsequent amplification stages, wherein at prior to entering each amplification stage a previously amplified optical signal is combined with a portion of the remnant pump light; and
    outputting an amplified light signal at an output port.

* * * * *